US012559009B2

(12) United States Patent
Kato et al.

(10) Patent No.: US 12,559,009 B2
(45) Date of Patent: Feb. 24, 2026

(54) DOOR-MOUNTED HANDREST

(71) Applicant: NHK SPRING CO., LTD., Yokohama (JP)

(72) Inventors: Kazuhito Kato, Yokohama (JP); Kousuke Suzuki, Yokohama (JP); Kenta Shintani, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 366 days.

(21) Appl. No.: 18/312,523

(22) Filed: May 4, 2023

(65) Prior Publication Data

US 2023/0382282 A1 Nov. 30, 2023

(30) Foreign Application Priority Data

May 24, 2022 (JP) ................................. 2022-084657

(51) Int. Cl.
*B60N 2/75* (2018.01)

(52) U.S. Cl.
CPC ............. *B60N 2/783* (2018.02); *B60N 2/767* (2018.02); *B60N 2/773* (2018.02)

(58) Field of Classification Search
CPC .......... B60N 2/783; B60N 2/78; B60N 2/767; B60N 2/773
USPC ........................................................ 296/153
See application file for complete search history.

(56) References Cited

U.S. PATENT DOCUMENTS 2,038,062 A * 4/1936 Emory .................... E05B 85/12
74/543
5,037,687 A 8/1991 Kargarzadeh et al.

| | | | | |
|---|---|---|---|---|
| 11,825,766 | B1 * | 11/2023 | Crowl ................... | A01D 34/824 |
| 2018/0304789 | A1 * | 10/2018 | Robert ................... | B60N 2/777 |
| 2018/0334106 | A1 * | 11/2018 | Beauregard ........... | B60N 2/767 |
| 2019/0077288 | A1 * | 3/2019 | Gayon ................... | B60N 2/797 |
| 2019/0143869 | A1 | 5/2019 | Sequi et al. | |
| 2019/0351799 | A1 * | 11/2019 | Kim ....................... | A47C 7/541 |

FOREIGN PATENT DOCUMENTS

| | | | | | |
|---|---|---|---|---|---|
| CN | 112060998 | A | * | 12/2020 | ............. B60N 3/001 |
| DE | 19746438 | A1 | * | 4/1999 | ............. B60N 2/773 |
| FR | 2713569 | A1 | * | 6/1995 | ............. B60N 2/78 |
| FR | 2845962 | A1 | * | 4/2004 | ............. B62D 1/12 |
| FR | 3065406 | A1 | * | 10/2018 | ............. B60N 2/767 |
| FR | 3066447 | A1 | * | 11/2018 | ........ B60R 11/0229 |
| FR | 3070916 | B1 | * | 9/2019 | ............. B60N 2/773 |
| FR | 3065407 | B1 | * | 5/2020 | ............. B60N 2/77 |
| FR | 3116484 | A1 | * | 5/2022 | ........ B64D 11/0644 |
| JP | H03-045317 | A | | 2/1991 | |
| JP | 2572429 | Y2 | * | 5/1998 | |
| JP | 2013-256240 | A | | 12/2013 | |

(Continued)

OTHER PUBLICATIONS

Office Action issued in Japanese Application No. 2022-084657, dated Oct. 7, 2025.

*Primary Examiner* — Hilary L Gutman

(74) *Attorney, Agent, or Firm* — Knobbe, Martens, Olson & Bear, LLP

(57) ABSTRACT

A door-mounted handrest is at the vehicle upper side relative to a door armrest of a side door of a vehicle. The door-mounted handrest projects toward a passenger compartment inner side from the side door. The handrest is configured to support the back of a hand of a vehicle occupant who is resting an elbow on the door armrest.

10 Claims, 3 Drawing Sheets

(56)          References Cited

FOREIGN PATENT DOCUMENTS

| JP | 2015-098239 A | 5/2015 | |
|---|---|---|---|
| JP | 2018-114921 A | 7/2018 | |
| JP | 2019-189018 A | 10/2019 | |
| JP | 2021-098511 A | 7/2021 | |
| KR | 200400106 Y1 * | 11/2005 | .............. B60N 2/77 |
| KR | 20190000431 U * | 2/2019 | .............. B60N 2/79 |
| KR | 20210079464 A * | 6/2021 | .............. B60N 2/77 |
| SE | 467731 B * | 9/1992 | ............. B60N 2/767 |

* cited by examiner

DOOR-MOUNTED HANDREST

CROSS-REFERENCE TO RELATED APPLICATION

This application is based on and claims priority under 35 USC 119 from Japanese Patent Application No. 2022-084657 filed on May 24, 2022, the disclosure of which is incorporated by reference herein.

BACKGROUND

Technical Field

The present disclosure relates to a door-mounted handrest that is mounted at a side door of a vehicle.

Related Art

Japanese Patent Application Laid-Open (JP-A) No. 2019-189018 discloses a table for a vehicle which table is attached to a door trim of a sliding door of the vehicle. This table for a vehicle combines a sliding rail and a hinge. Thus, deployment and stowing, front-and-rear position adjustment and angle adjustment of a table main body are enabled. As a result, flexibility in positioning of the table main body is enhanced. Therefore, in addition to a position of the table main body for simply placing objects thereon, a vehicle occupant may alter the table main body to a position that facilitates viewing of, for example, printed matter such as a book, a magazine or the like, visual equipment such as a tablet or a computer, and so forth.

SUMMARY

When an occupant of a vehicle is using a smartphone, the vehicle occupant often holds the smartphone in their hand while using the smartphone, which may be fatiguing for the hand and arm.

In consideration of the circumstances described above, an object of the present disclosure is to provide a door-mounted handrest that may moderate fatigue of a hand and arm when an occupant of a vehicle is holding and using a portable terminal such as a smartphone or the like in their hand.

A first aspect of the present disclosure is a door-mounted handrest that projects toward a passenger compartment inner side from a side door of a vehicle at a vehicle upper side relative to a door armrest of the side door, the door-mounted handrest being configured to support a back of a hand of a vehicle occupant who is resting an elbow on the door armrest.

In the first aspect, the back of the hand of the vehicle occupant whose elbow is placed on the door armrest of the side door of the vehicle may be supported by the door-mounted handrest that is projecting toward the passenger compartment inner side from the side door at the vehicle upper side relative to the door armrest. Therefore, both the hand and arm of a vehicle occupant holding and using a portable terminal in their hand may be supported, and fatigue of the hand and arm may be moderated.

A door-mounted handrest according to a second aspect includes, in the first aspect, a cushion member that resiliently supports the back of the hand of the vehicle occupant.

In the second aspect, the back of the hand of the vehicle occupant may be resiliently supported by the cushion member of the door-mounted handrest. Consequently, inhibition of blood flow in the hand may be suppressed, in addition to which transmission of running vibrations of the vehicle through the side door to the hand may be suppressed.

In a door-mounted handrest according to a third aspect, in the first aspect or the second aspect, the door-mounted handrest is configured to switch between: a projecting state in which the door-mounted handrest projects toward the passenger compartment inner side from the side door and a stowed state in which the door-mounted handrest is stowed in the side door.

According to the third aspect, the door-mounted handrest may be stowed in the side door when the door-mounted handrest is not being used.

A door-mounted handrest according to a fourth aspect includes, in the third aspect, a handrest main body that supports the back of the hand of the vehicle occupant, and a vertical rotation hinge that enables rotation of the handrest main body between the projecting state and the stowed state, the rotation being rotation relative to the side door about an axis along a vehicle vertical direction.

In the door-mounted handrest according to the fourth aspect, the handrest main body that supports the back of the hand of the vehicle occupant may be rotated by the vertical rotation hinge about the axis along the vehicle vertical direction relative to the side door, between the projecting position and the stowed position. Thus, the handrest main body may be stowed, for example, along a passenger compartment inner side face of the side door.

A door-mounted handrest according to a fifth aspect includes, in any one of the first to fourth aspects, a handrest main body that supports the back of the hand of the vehicle occupant, and a horizontal rotation hinge that enables rotation of the handrest main body relative to the side door about an axis along a vehicle width direction.

In the door-mounted handrest according to the fifth aspect, the handrest main body that supports the back of the hand of the vehicle occupant may be rotated by the horizontal rotation hinge about the axis along the vehicle width direction relative to the side door. Thus, the handrest main body may be rotated to an angle in line with the back of the hand of the vehicle occupant holding the portable terminal.

A door-mounted handrest according to a sixth aspect includes, in any one of the first to fifth aspects, a handrest main body that supports the back of the hand of the vehicle occupant, and a sliding mechanism that allows the handrest main body to slide in a vehicle front-and-rear direction relative to the side door.

In the door-mounted handrest according to the sixth aspect, the handrest main body supporting the back of the hand of the vehicle occupant may be slid in the vehicle front-and-rear direction relative to the side door by the sliding mechanism. Therefore, a position of the handrest main body in the vehicle front-and-rear direction may be adjusted in accordance with a position in the vehicle front-and rear-direction of a vehicle seat on which the vehicle occupant is sitting, and the like.

As described above, a door-mounted handrest according to the present disclosure may moderate fatigue of a hand or arm when an occupant of a vehicle is holding and using a portable terminal such as a smartphone or the like in the hand.

BRIEF DESCRIPTION OF THE DRAWINGS

Exemplary embodiments of the present invention will be described in detail based on the following figures, wherein.

DETAILED DESCRIPTION

Figure 1:
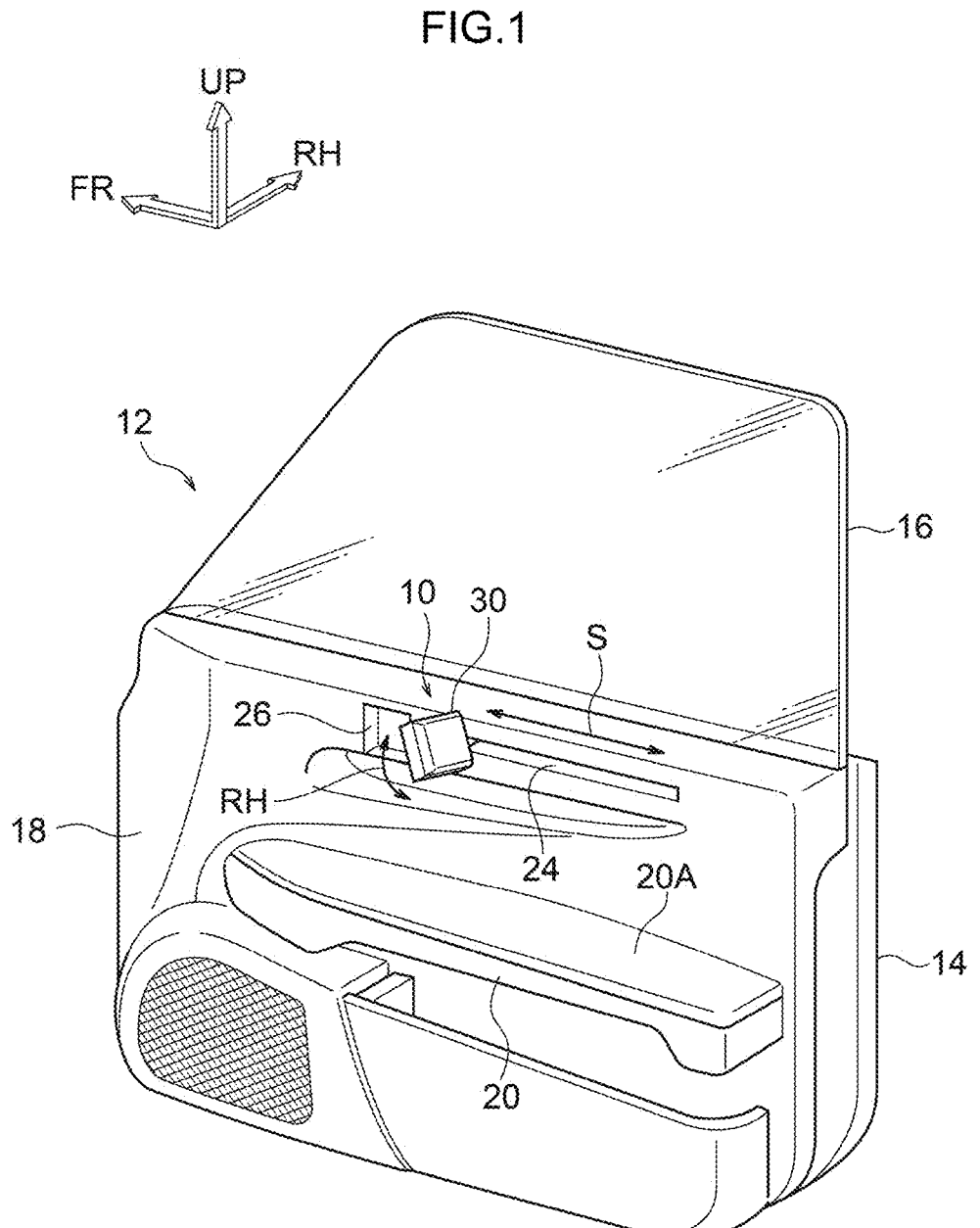
FIG. 1 is a perspective view showing a side door at which a door-mounted handrest according to an exemplary embodiment is mounted.

Below, a door-mounted handrest 10 (below referred to simply as the handrest 10) according to an exemplary embodiment of the present disclosure is described with reference to FIG. 1 to FIG. 5. With a view to aiding understanding of the drawings, some reference symbols may be omitted from the drawings. The arrows FR, LH and UP that are marked where appropriate in the drawings indicate, respectively, a front direction, a left direction and an upper direction of a vehicle.

As shown in FIG. 1, the handrest 10 according to the present exemplary embodiment is installed at a side door 12 of the vehicle. The side door 12 is, as an example, a front side door at the vehicle right side. The side door 12 is provided with a door main body 14, a door glass 16 and a door trim 18. The door main body 14 is formed of, for example, metal plate. The door glass 16 is supported to be capable of moving up and down relative to the door main body 14. The door trim 18 is formed of, for example, resin and is attached to the passenger compartment inner side (in this example the vehicle left side) of the door main body 14. Note that front, rear, left, right, upper and lower directions recited below are directions in a state in which the side door 12 is closed. The present exemplary embodiment may also be understood as an exemplary embodiment of a disclosure of the side door 12 at which the handrest 10 is mounted.

Figure 4:
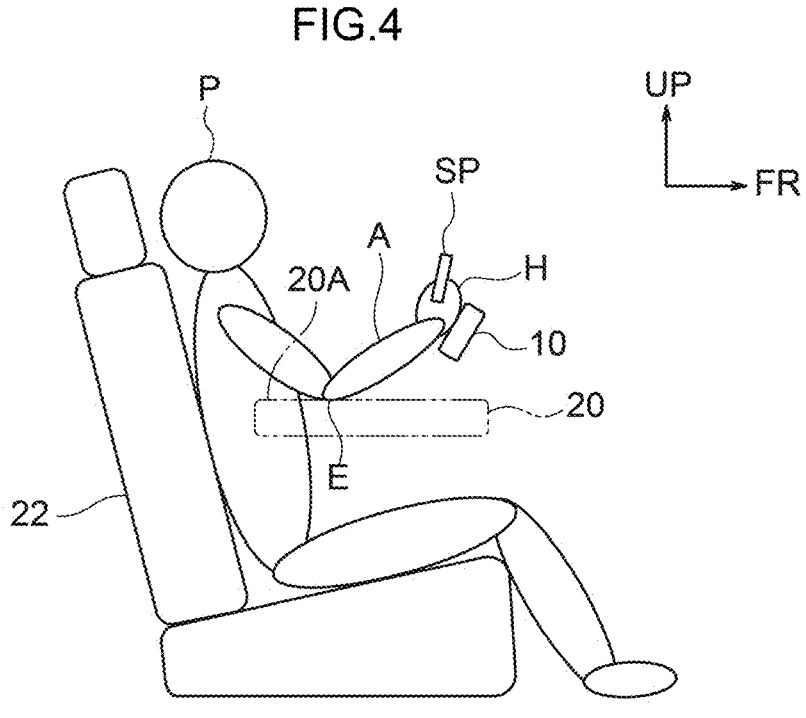
FIG. 4 is a side view showing a state in which a hand of a vehicle occupant who is resting an elbow on a door armrest of the side door is supported by the door-mounted handrest.

A door armrest 20 that projects toward the passenger compartment inner side is provided at a vertical direction middle portion of the door trim 18. The door armrest 20 extends, for example, from a front portion to a rear end portion of the side door 12. As shown in FIG. 4, a rear portion of an upper face of the door armrest 20 serves as an elbow rest portion 20A on which a vehicle occupant P sitting on a front seat 22 at the vehicle right side places an elbow. Power window switches and the like, which are not shown in the drawings, are disposed at a front portion of the upper face of the door armrest 20.

Figure 2:
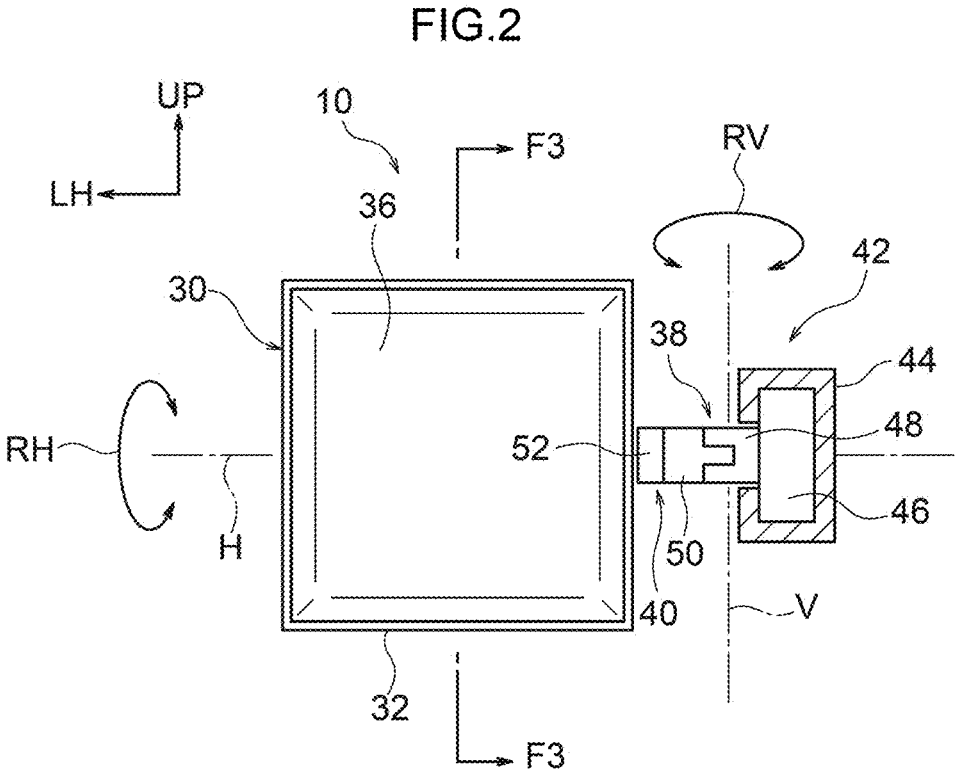
FIG. 2 is a partial sectional diagram showing structures of the door-mounted handrest according to the exemplary embodiment.

The handrest 10 according to the present exemplary embodiment is disposed at an upper end portion of the door trim 18 to the vehicle upper side of the door armrest 20. As shown in FIG. 2, the handrest 10 is provided with a handrest main body 30, a vertical rotation hinge 38, a horizontal rotation hinge 40 and a sliding mechanism 42. The handrest main body 30 supports the back of a hand H of the vehicle occupant P. The vertical rotation hinge 38 enables rotation of the handrest main body 30 relative to the side door 12 about an axis V along the vehicle vertical direction. The horizontal rotation hinge 40 enables rotation of the handrest main body 30 relative to the side door 12 about an axis H along the vehicle width direction. The sliding mechanism 42 allows the handrest main body 30 to slide in the vehicle front-and-rear direction relative to the side door 12.

Figure 3:
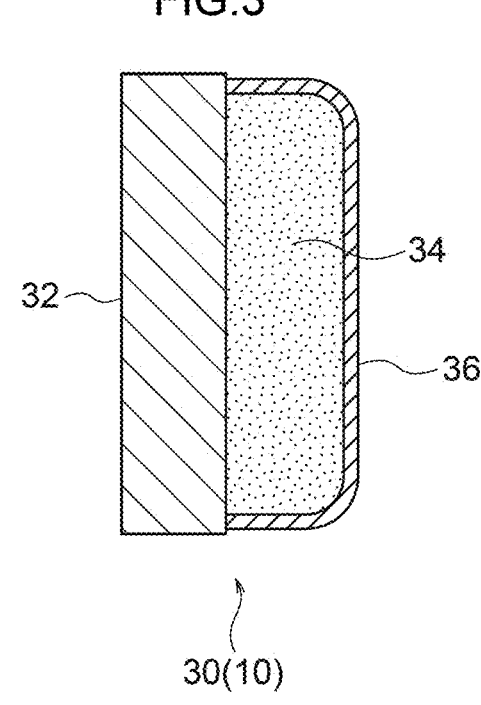
FIG. 3 is a sectional diagram showing a section cut along line F3-F3 in FIG. 2.

As shown in FIG. 3, the handrest main body 30 is structured by a base portion 32, a cushion member 34 and a cover member 36. The base portion 32 is, for example, formed in a rectangular plate shape of resin. The cushion member 34 is formed in a rectangular shape of a foam material such as urethane foam or the like. The cushion member 34 is superposed on a face of one plate thickness direction side of the base portion 32. The cover member 36 is formed of cloth, synthetic leather, leather or the like, and covers surfaces of the cushion member 34. Periphery edge portions of the cover member 36 are fixed to the base portion 32 by means such as, for example, adhesion, hooks or the like.

The handrest main body 30 with the structure described above is coupled to the sliding mechanism 42 via the vertical rotation hinge 38 and the horizontal rotation hinge 40. The sliding mechanism 42 includes a slide rail 44 and a slider 46. The slide rail 44 is, for example, formed in a long, narrow shape of metal. The slide rail 44 is fixed to a passenger compartment inner side face of an upper end portion of the door main body 14, in an attitude in which a length direction of the slide rail 44 is in the vehicle front-and-rear direction. In a cross section seen in the vehicle front-and-rear direction, the slide rail 44 is formed in a substantial "C" shape that is open to the passenger compartment inner side. The slide rail 44 is covered from the passenger compartment inner side thereof by the door trim 18 (see FIG. 1; not shown in FIG. 2). A slit 24 that extends in the vehicle front-and-rear direction is formed in the door trim 18 at positions corresponding with the opening of the slide rail 44.

The slider 46 is, for example, formed in a block shape of metal, and is disposed at the inner side of the slide rail 44. The slider 46 is supported to be capable of sliding in the vehicle front-and-rear direction relative to the slide rail 44. The slider 46 may be retained at arbitrary sliding positions by, for example, friction resistance produced between the slider 46 and the slide rail 44. The vertical rotation hinge 38 is attached to the slider 46.

The vertical rotation hinge 38 is attached to the slider 46 and extends to the passenger compartment inner side through the opening of the slide rail 44 and the slit 24 of the door trim 18. The vertical rotation hinge 38 includes a fixed portion 48, which is fixed to the slider 46, and a first rotary portion 50, which is coupled to the fixed portion 48 to be rotatable about the axis V along the vehicle vertical direction.

The horizontal rotation hinge 40 is structured by the above-mentioned first rotary portion 50 and a second rotary portion 52, which is disposed at the opposite side of the first rotary portion 50 from the side thereof at which the fixed portion 48 is disposed. That is, the first rotary portion 50 is used as a structural element of both the vertical rotation hinge 38 and the horizontal rotation hinge 40. The second rotary portion 52 is coupled to the first rotary portion 50 to be rotatable about the axis H, which is along a vehicle width direction.

The vertical rotation hinge 38 and horizontal rotation hinge 40 described above are widely known torque hinges (known as free stop hinges) that are structured to be stoppable at arbitrary rotation positions by friction resistance with respective hinge pins thereof, which are not shown in the drawings. The handrest main body 30 can be retained at arbitrary rotation positions by the vertical rotation hinge 38 and horizontal rotation hinge 40. The vertical rotation hinge 38 and horizontal rotation hinge 40 are not limited to being torque hinges but may be ratchet hinges with friction functions, in which case the handrest main body 30 may be retained at plural stepwise rotation positions. The terms "vertical" and "horizontal" as used above are not necessarily strict terms and are intended to include the meanings "substantially vertical" and "substantially horizontal".

The handrest 10 with the structure described above can attain a projecting state (the state shown in FIG. 1 and FIG. 2) in which the handrest 10 projects toward the passenger compartment inner side from the side door 12 at the vehicle upper side relative to the door armrest 20 of the side door 12, as shown in FIG. 4. In this projecting state, the handrest main body 30 is disposed diagonally front-upward in the vehicle relative to the elbow rest portion 20A of the door armrest 20. In the projecting state, a projection amount of the handrest 10 from the surface of the door trim 18 is specified to be within a range of, for example, 100 mm to 200 mm.

The handrest 10 in the projecting state may support the back of the hand H of the vehicle occupant P, who rests an elbow E on the elbow rest portion 20A of the door armrest 20, diagonally from the lower-front side in the vehicle of the hand H. To be more specific, the handrest 10 in the projecting state is rotatable by rotation of the handrest main body 30 about the horizontal rotation hinge 40 to a rotation position at which the cover member 36 is facing diagonally rear-upward in the vehicle. The back of the hand H of the vehicle occupant P may be resiliently supported by the handrest main body 30 at this rotation position, being supported by the cushion member 34 via the cover member 36. The vehicle occupant P mentioned above has, for example, a physical build equivalent to an AM50 test dummy (the 50th percentile of American adult males) or a JM50 test dummy (the 50th percentile of Japanese adult males).

In the present exemplary embodiment, a recess portion 26 for accommodating the handrest main body 30 is formed in the door trim 18 of the side door 12 at the vehicle front side of the above-mentioned slit 24. The recess portion 26 is open to the passenger compartment inner side and is in communication with the above-mentioned slit 24. In a state in which the handrest main body 30 is slid to a frontmost end position of a sliding range of the sliding mechanism 42, the handrest main body 30 is rotated about the vertical rotation hinge 38 and is thus stowed in the recess portion 26. That is, the handrest 10 according to the present exemplary embodiment is structured to be configured to switch between the projecting state that projects toward the passenger compartment inner side from the side door 12 and a stowed state in which the handrest 10 is stowed in the side door 12. In this stowed state, the handrest 10 is in an attitude in which the plate thickness directions of the base portion 32 and the cushion member 34 are in the vehicle width direction and a surface of the cover member 36 is disposed to be substantially coplanar with the surface of the door trim 18.

Now, operation and effects of the present exemplary embodiment are described.

In the present exemplary embodiment, the back of the hand H of the vehicle occupant P who is resting an elbow on the door armrest 20 of the side door 12 may be supported by the handrest 10 projecting toward the passenger compartment inner side from the side door 12 at the vehicle upper side relative to the door armrest 20. As a result, as illustrated in FIG. 4, both the hand H and arm A of the vehicle occupant P who is holding and using a smartphone SP in the hand H may be supported, and fatigue of the hand H and arm A may be moderated.

Figure 5:
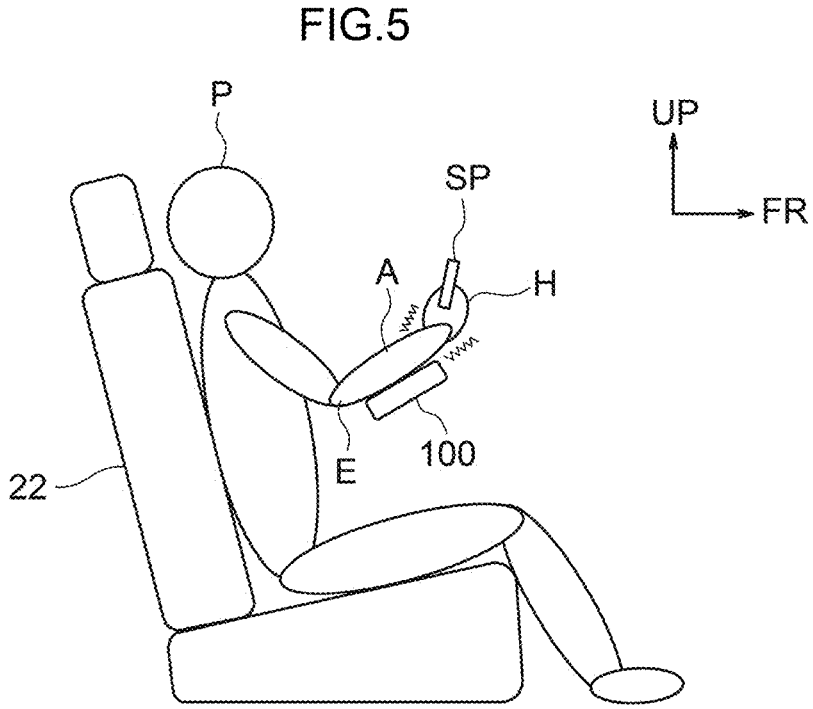
FIG. 5 is a side view showing a state in which a forearm region of a vehicle occupant is supported by an armrest according to a comparative example.

When, for example, the arm A (a forearm region) of a vehicle occupant P who is holding and using the smartphone SP in the hand H is supported by a table 100 mounted at a side door or the like, as in the comparative example shown in FIG. 5, fatigue builds up at the wrist of the vehicle occupant P. Further, although not shown in the drawings, when the hand H holding the smartphone SP is supported by this table 100, fatigue builds up in the forearm region, an upper arm region or the like. In the present exemplary embodiment, by contrast, because both the hand H and the elbow E are supported, fatigue may be moderated in both the hand H and the arm A.

During running of the vehicle in the comparative example described above, vibrations and swaying occur at the smartphone SP. As a result, a screen of the smartphone SP is harder for the vehicle occupant P to see, which is a cause of motion sickness. In the present exemplary embodiment, by contrast, because the back of the hand H holding the smartphone SP is supported by the handrest 10, vibrations and swaying of the smartphone SP are reduced. As a result, the screen of the smartphone SP is easier for the vehicle occupant P to see, suppressing motion sickness.

In the present exemplary embodiment, the back of the hand H of the vehicle occupant P may be resiliently supported by the cushion member 34 of the handrest main body 30 of the handrest 10. Therefore, inhibition of blood flow in the hand H may be suppressed, in addition to which transmission of running vibrations of the vehicle through the side door 12 to the hand H may be suppressed. As a result, the screen of the smartphone SP is even easier for the vehicle occupant P to see, further suppressing motion sickness.

In the present exemplary embodiment, the handrest 10 can attain the projecting state in which the handrest 10 projects toward the passenger compartment inner side from the side door 12 and the stowed state in which the handrest 10 is stowed in the side door 12. Therefore, the handrest 10 may be stowed in the side door 12 when the handrest 10 is not being used.

In the present exemplary embodiment, the handrest main body 30 that supports the back of the hand H of the vehicle occupant P may be rotated by the vertical rotation hinge 38 about the axis V along the vehicle vertical direction relative to the side door 12, between the projecting position and the stowed position. As a result, the handrest main body 30 may be stowed in line with the passenger compartment inner side face of the side door 12 (that is, stowed to be narrow in the vehicle width direction).

In the present exemplary embodiment, the handrest main body 30 may be rotated by the horizontal rotation hinge 40 about the axis along the vehicle width direction relative to the side door 12. Therefore, the handrest main body 30 may be rotated to an angle in line with the back of the hand H of the vehicle occupant P holding the smartphone SP.

In the present exemplary embodiment, the handrest main body 30 may be slid in the vehicle front-and-rear direction relative to the side door 12 by the sliding mechanism 42. Therefore, a position of the handrest main body 30 in the vehicle front-and-rear direction may be adjusted in accordance with a position in the vehicle front-and-rear direction of the front seat 22 on which the vehicle occupant P is sitting, and the like.

According to the descriptions above, in the present exemplary embodiment the elbow E and hand H of the vehicle occupant P who is holding and using the smartphone SP in the hand H may be simultaneously supported at respectively optimum positions and angles by the elbow rest portion 20A of the door armrest 20 and the handrest main body 30 (that is, by two surfaces at different angles). Consequently, the vehicle occupant P may use the smartphone SP in a comfortable attitude without tension in the wrist, the shoulder and the like.

In the exemplary embodiment described above, the handrest main body 30 is rotated about the axis V along the vehicle vertical direction to be stowed in the recess portion 26 of the door trim 18, but this is not limiting. For example, a structure is possible in which the handrest main body 30 is slid to the vehicle width direction outer side relative to the side door 12 to be stowed in the side door 12.

In the exemplary embodiment described above, the handrest main body 30 is a structure that includes the cushion member 34, but this is not limiting. For example, a surface shape of a handrest main body may be a depressed shape that fits to the back of a hand of a vehicle occupant.

Numerous modes may be embodied within a scope that does not depart from the gist of the present disclosure. It will also be clear that the scope of the present disclosure is not to be limited to the exemplary embodiment described above.

What is claimed is:

1. A door-mounted handrest, wherein the door-mounted handrest is configured to projects toward a passenger compartment inner side from a side door of a vehicle, at a vehicle upper side relative to a door armrest of the side door, the door-mounted handrest being configured to support a back of a hand of a vehicle occupant who is resting an elbow on the door armrest, wherein the door-mounted handrest is configured to switch between:

a projecting state in which the door-mounted handrest projects toward the passenger compartment inner side from the side door; and a stowed state in which the door-mounted handrest is stowed in the side door, wherein the door-mounted handrest comprises:

a handrest main body configured to support the back of the hand of the vehicle occupant; and a vertical rotation hinge configured to enable a rotation of the handrest main body between the projecting state and the stowed state, the rotation being a rotation relative to the side door about an axis along a vehicle vertical direction, wherein a recess portion for accommodating the handrest main body is formed in a door trim of the side door.

2. The door-mounted handrest according to claim 1, comprising a cushion member that resiliently supports the back of the hand of the vehicle occupant.

3. The door-mounted handrest according to claim 1, comprising:

a horizontal rotation hinge that enables rotation of the handrest main body relative to the side door about an axis along a vehicle width direction.

4. The door-mounted handrest according to claim 3, comprising:

a sliding mechanism that allows the handrest main body to slide in a vehicle front-and-rear direction relative to the side door.

5. The door-mounted handrest according to claim 1, comprising:

a sliding mechanism that allows the handrest main body to slide in a vehicle front-and-rear direction relative to the side door.

6. The door-mounted handrest according to claim 1, wherein the recess portion is located above the door armrest and is formed to open to the passenger compartment inner side in a vehicle width direction.

7. The door-mounted handrest according to claim 1, wherein the door armrest is provided with a slide mechanism in the side door that allows the handrest main body to slide in a vehicle front-and-rear direction relative to the side door, and the recess portion is formed on the front side of the slide mechanism.

8. The door-mounted handrest according to claim 2, comprising:

a horizontal rotation hinge that enables rotation of the handrest main body relative to the side door about an axis along a vehicle width direction.

9. The door-mounted handrest according to claim 2, comprising:

a sliding mechanism that allows the handrest main body to slide in a vehicle front-and-rear direction relative to the side door.

10. The door-mounted handrest according to claim 8, comprising:

a sliding mechanism that allows the handrest main body to slide in a vehicle front-and-rear direction relative to the side door.

* * * * *